United States Patent [19]

Neufeld

[11] Patent Number: 4,749,157
[45] Date of Patent: Jun. 7, 1988

[54] SPACECRAFT ACCELEROMETER AUTO-ALIGNMENT

[75] Inventor: Murray J. Neufeld, Studio City, Calif.

[73] Assignee: Hughes Aircraft Company, Los Angeles, Calif.

[21] Appl. No.: 897,237

[22] Filed: Aug. 18, 1986

[51] Int. Cl.$^4$ .............................................. B64G 1/36
[52] U.S. Cl. .................................. 244/171; 244/164
[58] Field of Search ................ 244/164, 171; 73/503, 73/505, 510; 364/453, 454, 459, 566

[56] References Cited

U.S. PATENT DOCUMENTS

| | | | |
|---|---|---|---|
| 2,942,864 | 6/1960 | Sikora | 73/505 |
| 3,269,179 | 8/1966 | Anderson | 364/453 |
| 3,442,140 | 5/1969 | Pelteson | 364/453 |
| 4,601,206 | 7/1986 | Watson | 73/505 |

Primary Examiner—Joseph F. Peters, Jr.
Assistant Examiner—Rodney Corl
Attorney, Agent, or Firm—S. M. Mitchell; M. J. Meltzer; A. W. Karambelas

[57] ABSTRACT

A spin-stabilized spacecraft has a pair of three-axis accelerometers (A, C) mounted on the spacecraft rotor (10) to provide for self-aligning, enduring and sophisticated navigational capability. A second pair of accelerometers (B, D) is added for redundancy and added sensitivity. Each pair of accelerometers are disposed at diametrically opposed positions on the rotor and respective axes are co-aligned. The orientation of spacecraft angular momentum $\bar{h}$ is determined by star and planet sensors.

Radial alignment of each accelerometer relative to the spacecraft angular momentum is attained by zeroing non-radial accelerometer readings during spacecraft quiescence. Axial alignment is attained during periods of substantially axial thrust by isolating axial translational acceleration by summing readings across an accelerometer pair to cancel rotational, spin-periodic contributions to the readings and time-averaging or otherwise filtering to cancel other non-axial periodic contributions to the readings. Axial alignment is automatically effected upon the correct alignment of the radial and tangential axes of each accelerometer.

9 Claims, 2 Drawing Sheets

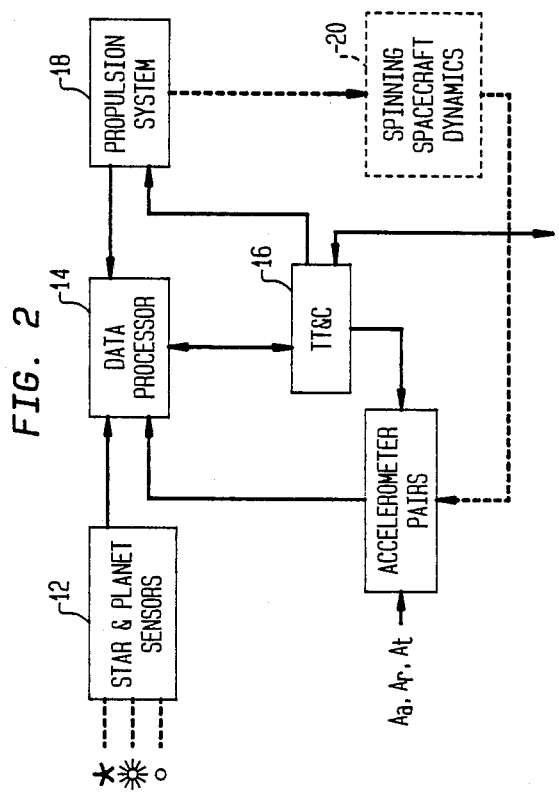

SPACECRAFT ACCELEROMETER AUTO-ALIGNMENT

BACKGROUND OF THE INVENTION

The present invention relates to spacecraft navigation, and, more particularly, to a system and method providing for on-board alignment of navigational accelerometers.

Spacecraft navigation is facing increased demands. Formerly, spacecraft navigation involved attaining a desired orbit and making occasional corrections to maintain the orbit. More recently, however, multiple-year missions involve, for example, more distant objectives of autonomous orbit change or re-entry. These subsequent missions require navigational systems capable of meeting objectives far more complex than maintaining orbit and far more enduring than navigational systems designed for attaining orbit.

One challenge faced in developing such an enduring navigational system is maintaining its calibration or alignment with respect to an inertial frame of reference. This is particularly true where it is impractical to perform this alignment on a regular basis from a ground or other remote station.

One navigational approach has been to mount three-axis accelerometers on a gyro-stabilized platform mounted on a launch vehicle or spacecraft. The gyro-stabilized three-axis accelerometers provide an acceleration history which can be integrated once to obtain a velocity history and integrated twice to obtain a position history for the spacecraft in a known coordinate system. The histories so obtained are used to attain elaborate navigational objectives. The alignment of the accelerometer is maintained by the characteristics of the gyro. Such an arrangement has been used effectively in guiding the ascent of a satellite to a predetermined orbit.

The mechanical limitations of such an arrangement in the face of launch stresses, environmental extremes in space, mechanical creep, other stresses and uncompensatable random drift rates and biases limit the long-term accuracy of the gyros of such an arrangement. Accordingly, the accelerometer-on-a-gyro approach has not proved satisfactory when a regenerative mission objective requires elaborate navigation months or years after orbit is first attained. Thus, such systems require remote realignment of accelerometers if such realignment is provided for at all. Other systems require dedicated celestial body trackers physically tied to the gyro platform to achieve the realignment and calibration of the gyros. Still other systems discuss a "strap-down" method as speculated in "Theory of Inertial Guidance" by Connie L. McClure, Prentice Hall 1960, pp. 286–291.

Spinning spacecraft have more enduring orientation aids such as attitude and nutation sensors. However, while these are well-adapted for maintaining and adjusting attitude, they are not suited for extensive spacecraft navigation. In other words, they cannot readily yield a substitute for the instantaneous acceleration histories provided by accelerometers during periods of thrust.

What is needed is a system and method for realignment of a navigational inertial coordinate system. The system should provide for self-alignment and operate for extended periods essentially autonomously, without the constraints of navigation gyros. The system should be capable of managing demanding navigational objectives after an extended orbital period.

SUMMARY OF THE INVENTION

A spin-stabilized spacecraft includes a platform and a rotor. A pair of circumferentially spaced three-axis accelerometers located on the rotor provide acceleration histories for navigation. In accordance with the present invention, radial alignment of each accelerometer relative to the spacecraft angular momentum, $\bar{h}$ (FIG. 1), is performed during periods of quiescence and axial alignment is performed during periods of thrust.

Using a pair of circumferentially spaced accelerometers permits mathematical cancellation of certain rotationally-induced acceleration components. Other non-translational periodic components can be cancelled through time-averaging or otherwise filtering individual accelerometer readings. Accordingly, accelerational components, can be isolated to permit alignment of the accelerometers.

The particulars of cancellation are dependent on the relative placement and orientation of the two accelerometers. The mathematical computations can be greatly simplified in the case where the accelerometers are located at diametrically opposed positions on the rotor and their respective axes co-oriented. With this arrangement, the accelerometer readings can be simply summed, averaged or otherwise filtered to cancel rotational contributions to individual accelerometer readings.

During a period of quiescence, a spin-stabilized spacecraft is spinning in orbit with negligible non-gravitational acceleration, nutation or precession. In this quiescent state, the axial and tangential acceleration components ae negligible. A non-zero tangential or axial acceleration reading by the accelerometers can be treated as an error signal to be zeroed through realignment to a plane perpendicular to the angular momentum vector, $\bar{h}$.

During a period of thrust with substantial axial acceleration components, the accelerations at the accelerometer locations can be mathematically combined so as to cancel non-translational, spin periodic accelerometer readings due, for example, to torquing. Other non-axial, periodic (e.g. nutational) components can be generally time-averaged to zero or digitally filtered. Thus, resultant non-zero readings can serve as axial and tangential accelerometer alignment error signals to be corrected through realignment about the redial direction and perpendicular to the angular momentum, $\bar{h}$. Periods of thrust occur during initial ascent, north-south station keeping, orbit adjustment, and, if necessary, during maneuvers undertaken specifically for accelerometer alignment.

Redundancy and increased sensitivity can be provided by adding a second pair of diametrically opposed accelerometers, each located a quarter turn from each of the accelerometers of the first pair. Thus, a force which may be small relative to the centripetal force of the spinning rotor and therefore difficult to detect as a radial component of an accelerometer of, for example, the first pair, can be readily detected as a tangential component by an accelerometer of the second pair. Also, if an accelerometer fails, one pair remains for navigational purposes.

In accordance with the foregoing description, a system and method for on-board alignment of an accelerometer-within-a-gyro-based navigational system is provided. The accelerometers are well-established for major navigational objectives and are less prone to long-term errors than gyro instruments. While remote calibration can supplement, the provision of on-board alignment ensures the availability of this autonomous navigation capability months or years after initial orbit is attained, depending primarily on the completeness of the on-board ephemeris-generating program and the accuracy of the sensor-based, time independent on-board attitude determination subsystem.

BRIEF DESCRIPTION OF THE DRAWINGS

In the accompanying drawings:

FIG. 2 is a block diagram of a navigational system in accordance with the present invention.

DESCRIPTION OF THE PREFERRED EMBODIMENTS

Figure 1:
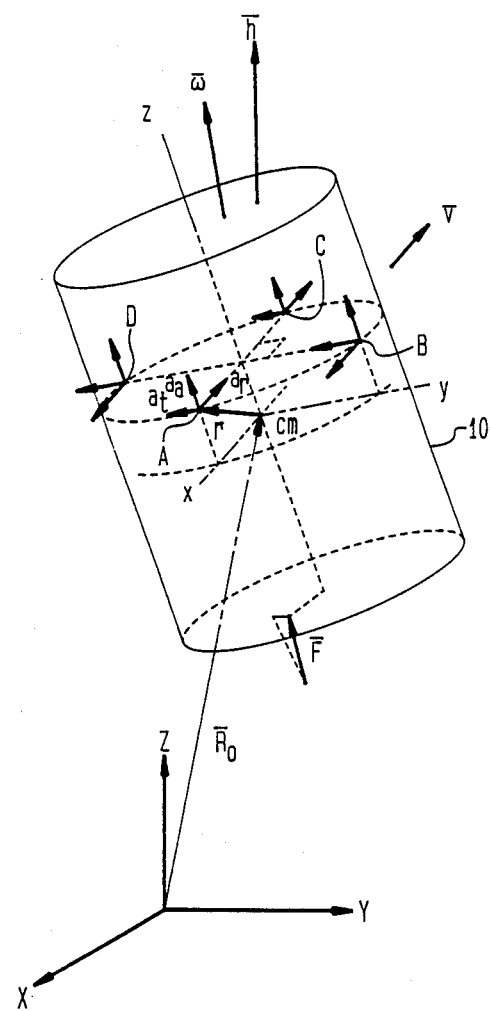
FIG. 1 shows a rotor of a spin-stabilized spacecraft with accelerometers mounted thereon in accordance with the present invention.

In accordance with the present invention, the rotor 10 of a spin-stabilized spacecraft has mounted thereon a pair of accelerometers A, C as shown in FIG. 1. The accelerometers A, C are aligned radially during quiescent orbit and axially during periods of thrust. Since the accelerometers are spaced circumferentially, their readings can be mathematically combined to cancel spin-periodic and centripetal acceleration components. Other non-axial periodic (e.g. nutation) components can be generally time-averaged to zero or otherwise filtered to isolate variables of interest.

For computational simplicity, the accelerometers A, C can be diametrically opposed, i.e., be spaced 180° about the circumference of the rotor 10 and their respective axes co-oriented. However, the present invention provides for alternative circumferential spacings and relative orientations. A second pair of accelerometers B, D can be included for increased sensitivity and redundancy.

While only the rotor 10 and accelerometers A, B, C, D are illustrated, it is understood that a spin-stabilized spacecraft typically includes a platform upon which most of the mission equipment is placed. The platform is relatively despun, while the rotating rotor 10 supplies directional stability to the spacecraft. Of course, equipment, such as attitude sensors intended to be rotated, can be mounted on the rotor 10.

The translational motion of the spacecraft is indicated by velocity vector $\bar{v}$, while the position of the spacecraft having rotor 10 is identified by the displacement vector $\bar{R}_o$ of the spacecraft center of mass cm relative to the origin of an inertial frame of reference X, Y, Z. Passing through the center of mass cm are the principal or geometric axes of the spacecraft x, y, z, the last being the spin axis z of the spacecraft.

The instantaneous spin vector $\bar{\omega}$ is shown noncoincident with the spin axis z, as would be the case during nutation. Nutation, or more colloquially, wobble, is generally undesirable and so nutation damping is widely employed. In the absence of nutation and other forms of perturbation, $\bar{\omega}$ and z are coincident.

During such periods of quiescence, i.e. while the rotor is spinning, but in the absence of nutation, precession or thrust, the angular momentum $\bar{h}$ is colinear with the spin axis z and the spin vector $\bar{\omega}$. However, $\bar{h}$ can diverge from the spin axis z and the spin vector $\bar{\omega}$ due to the application of a thrust force $\bar{F}$ whose direction is offset from the instantaneous center of mass cm.

The angular momentum $\bar{h}$ is particularly important because its orientation can be very precisely determined using celestial, e.g., star, sun, moon, earth feature sensors mounted on the rotor. For example, a star sensor can determine the spacecraft angular momentum direction relative to inertial coordinates to within 2 arc-seconds. Thus, in accordance with the present invention, the alignment of accelerometers in inertial space can be precisely determined by aligning the accelerometers with respect to the angular momentum $\bar{h}$ of the spacecraft.

Before explaining the alignment of the accelerometers A, B, C and D, their use in a navigational mode is explained with reference to FIG. 2. The star and planet sensors 12 provide attitude and angular momentum data while the accelerometers provide acceleration histories. This data is processed by an on-board data processor 14 to determine orbit changes and attitude. The raw data can also be sent to ground processing stations via a tracking, telemetry and command (TT+C) module 16.

A ground station can program the TT+C 16 module with mission objectives which are compared by the data processor 14 with present orbit and attitude data to determine appropriate commands to the propulsion system 18. The action of the propulsion system 18 is fed back to the on-board processor 14 to obtain a better coordination of propulsion commands and their effects on orbit and attitude. The effect of the propulsion system 18 on the spinning spacecraft dynamics 20 are reflected in the readings of the accelerometer pairs A, C and B, D.

Conveniently, the accelerometers are disposed in diametrically opposed pairs. This will cause the centripetal and spin-period components of acceleration due to rotor rotation rather than spacecraft translation to cancel. Thus, by combining the data of an accelerometer pair and computationally compensating or filtering other (e.g. nutation) periodic components, translational acceleration histories due to thrust forces can be obtained in a straightforward manner. An acceleration history so obtained cn be integrated once to obtain a velocity history and twice to obtain a positional history. In this way, each accelerometer pair, A and C, B and D, can provide information sufficient for complex navigation.

In addition to providing redundancy, the second pair B, D of accelerometers provide additional sensitivity. Since the pairs are orthogonally disposed with respect to one another, a force which is radial with respect to one pair is tangential with respect to the other. An orbit-correction radial thrust pulse might be very small in magnitude compared to ongoing radial forces and thus difficult to detect by an accelerometer positioned radially with respect to the pulse. However, an accelerometer disposed one quarter circumference from the radially positioned accelerometer could assess the pulse with much greater precision. This is because the ongoing tangential force is nominally zero and should not mask the effect of the pusle to the extent that the inherent radial force would.

However, the usefulness of the accelerometers A, B, C, D is premised on their orientations being precisely known with respect to an inertial frame. The invention provides for precise alignment relative to an inertial frame as explained below.

Each accelerometer A, B, C, D is a three-axis accelerometer, comprising three mutually orthogonal one-dimensional accelerometers, a nominally radial axis $a_r$, a nominally tangential axis $a_t$, and a nominally axial axis $a_a$. The three axes are reliably and rigidly disposed relative to each other so that it can be assumed that if two are properly aligned, then the third is properly aligned. Thus, the challenge reduces to aligning two of the axes of each accelerometer with respect to the angular momentum $\bar{h}$, the direction of which is known in inertial coordinates from the readings of the star and planet sensors 12.

The two axes to be aligned are the radial and the axial axes, with tangential alignment automatically resulting. Radial alignment is effected during spacecraft quiescence and the axial alignment is effected during periods of thrust. Since quiescence is the usual state, it is convenient to consider the radial alignment as occurring first and the axial, and concomitantly, the tangential alignment occurring afterwards. However, conceptually, and in accordance with the present invention, axial alignment can occur prior to radial alignment and resultant tangential alignment.

Radial alignment takes place during quiescence, which, as stated above, means that the rotor is rotating, but free of perturbations, nutation or precession. In this case, the spin axis z, the spin vector $\bar{\omega}$ and the angular momentum $\bar{h}$ are aligned and the axial and tangential acceleration components at each accelerometer position are zero. Alternatively, the readings of opposing accelerometers can be summed so that the radial component is doubled and the tangential components cancel. A properly aligned pair of accelerometers should give a substantial radial reading and zero readings in the tangential and axial directions.

Any non-zero tangential or axial reading is treated as an error signal and converted by the data processor 14 into an alignment correction command to be implemented through the TT+C module. This correction can be implemented by issuing commands to move mechanical pivots upon which an accelerometer is mounted. However, electronic, rather than mechanical, compensation can be advantageously applied using the memory of the on-board data processor 14.

It is not necessary that the spacecraft be completely quiescent to effect radial alignment. The component cancelling techniques described below for isolating axial acceleration can be applied to compensate for deviations from quiescence. For example, nutation can be accounted for by averaging over a nutation cycle or by compensating for nutation by measuring it and adjusting the acceleration data accordingly. However, in practice, quiescence can be attained to the extent required for purposes of radial alignment.

Axial alignment is effected during periods of thrust, $\bar{F} \neq 0$. These may be initiated by ground command for orbit and attitude changes, or otherwise. The commands are sent via the TT+C module 16 to the propulsion system 18, which in turn affects the spacecraft dynamics 20, which effects are read by the accelerometers A, B, C and D. The readings of each pair of accelerometers are summed, to cancel and/or compensate periodic acceleration components due to spacecraft precession and/or nutation, and then integrated over several revolutions, to obtain velocity change data $2(\Delta V_i)$ along each of the three corresponding pairs of accelerometer axes, i=1, 2, 3.

Since non-translational components of $\Delta V_i$ for the most part cancel, their values are used to indicate the effective axial component $\bar{F}_a$ of thrust $\bar{F}$. Radial components of thrust $\bar{F}$ are substantially spin-averaged to zero.

$\bar{F}_a$ is parallel to the average direction of $\bar{h}$. Thus, $a_a$ is aligned for each accelerometer by zeroing the radial and tangential readings. Assuming radial alignment is previously effected, each $a_a$ axis is aligned in the process of aligning the respective tangential $a_t$.

Radial alignment can be conveniently performed as often as desired. The axial and tangential alignment should be done during north-south station-keeping maneuvers to maximize alignment sensitivity.

Similar results can be achieved from different approaches. Axial alignment can involve orienting the axial axes to maximal values rather than zeroing the radial and tangential axes although this is a less sensitive method. Also, diametrically opposed accelerometers need not be co-oriented. For example, both accelerometers of a pair can have their radial axes directed toward the spin axis and their tangential axes co-parallel. In this case, adding readings would cancel non-translational centripetal acceleration components, although this too is a less sensitive method.

In accordance with the foregoing detailed description, a self-alignment spacecraft navigational system with improved duration and navigational capability is provided. Many modifications and variations of the disclosed embodiment are provided for by the present invention. For example, different accelomenter relative positions and orientations involving different mathematical approaches can be applied readily. Therefore, the present invention is to be limited only by the scope of the following claims.

What is claimed is:

1. A spacecraft with autonomous navigation accelerometer alignment comprising:
   a spin-stabilized spacecraft having a platform and a rotor with a spin axis;
   a pair of three-axis accelerometer circumferentially spaced about said rotor;
   means for applying force to said spacecraft to induce acceleration with a substantial translational axial component;
   means for detecting and correcting radial alignment error in each accelerometer when said spacecraft is in a quiescent state; and
   means for detecting and correcting axial alignment error in each accelerometer when said spacecraft is accelerating with a substantial component in said axial direction.

2. The spacecraft of claim 1 further characterized in that said accelerometers are in substantially diametrically opposed locations with respect to said spin axis.

3. The spacecraft of claim 2 further characterized in that the respective axes of said accelerometers are co-oriented.

4. The spacecraft of claim 2 further comprising at least a second pair of accelerometers in substantially diametrically opposed locations on said rotor with respect to each other, each of said second pair of accelerometers being located substantially one quarter circumference from each of the accelerometers of said first pair.

5. A method of realigning a three-dimensional reference coordinate system on board a thruster-controlled orbiting spin-stabilized spacecraft having a platform and a rotor which rotates about a spin axis, said spacecraft being subject to dynamic imbalance resulting in misalignment of the reference coordinate system, comprising the steps of:

(a) placing at least one pair of accelerometers on the rotor at respective positions radially spaced from said spin axis and circumferentially spaced with respect to each other, each accelerometer having three sensing axes for respectively sensing acceleration of the rotor with respect to said spin axis;

(b) aligning each of said accelerometers radially with respect to said spin axis while the spacecraft is not being acted on by a thrust force; and (c) aligning each of said accelerometers axially with respect to said spin axis while the spacecraft is being acted upon by a thrust force.

6. The method of claim 5 with step (a) being further characterized in that said accelerometers are placed in substantially diametrically opposed locations on said rotor.

7. The method of claim 6 with step (a) further involving placing at least a second pair of accelerometers in substantially diametrically opposed locations on said rotor, each accelerometer of said second pair being spaced circumferentially one quarter circle from each accelerometer of said first pair.

8. A spin-stabilized spacecraft comprising:
a rotor;
a pair of three-axis accelerometers circumferentially spaced upon and fixed to said rotor;
means for obtaining quiescent state readings from each of said accelerometers;
means for determining from said quiescent state readings errors in the radial alignment of each of said accelerometers;
means for correcting said errors in radial alignment;
means for obtaining thrust state readings from each of said accelerometers;
means for mathematically combining and time-averaging the thrust state readings of said accelerometers so as to yield calculated axial translational components; and
means for axially aligning each of said accelerometers so that its axial readings match said calculated axial translational components.

9. A method of calibrating a navigational system comprising the steps of:
mounting a pair of three-axis accelerometers circumferentially spaced upon a rotor;
obtaining quiescent state readings from each of said accelerometers;
determining from said quiescent state readings errors in radial alignment for each accelerometer;
correcting said errors in radial alignment;
reading thrust state histories from each accelerometer;
mathematically combining said thrust state histories to cancel rotational spin-periodic contributions to said accelerometer readings and filtering said thrust state histories to cancel other non-axial periodic components of acceleration to yield calculated axial translational components;
for each accelerometer, determining the axial orientation which would have resulted in a thrust state history corresponding to said calculated axial translational components and align accordingly.

* * * * *